(12) United States Patent
Gandhi et al.

(10) Patent No.: US 11,573,904 B2
(45) Date of Patent: Feb. 7, 2023

(54) TRANSPARENT SELF-REPLICATING PAGE TABLES IN COMPUTING SYSTEMS

(71) Applicant: VMware, Inc., Palo Alto, CA (US)

(72) Inventors: Jayneel Gandhi, Sunnyvale, CA (US); Reto Achermann, Ennetburgen (CH)

(73) Assignee: VMware, Inc., Palo Alto, CA (US)

( * ) Notice: Subject to any disclaimer, the term of this patent is extended or adjusted under 35 U.S.C. 154(b) by 551 days.

(21) Appl. No.: 16/256,676

(22) Filed: Jan. 24, 2019

(65) Prior Publication Data
US 2020/0117612 A1    Apr. 16, 2020

Related U.S. Application Data

(60) Provisional application No. 62/744,990, filed on Oct. 12, 2018.

(51) Int. Cl.
| | |
|---|---|
| *G06F 12/00* | (2006.01) |
| *G06F 13/00* | (2006.01) |
| *G06F 12/1009* | (2016.01) |
| *G06F 9/455* | (2018.01) |
| *G06F 16/907* | (2019.01) |
| *G06F 16/901* | (2019.01) |
| *G06F 12/12* | (2016.01) |

(52) U.S. Cl.
CPC ...... *G06F 12/1009* (2013.01); *G06F 9/45554* (2013.01); *G06F 12/12* (2013.01); *G06F 16/907* (2019.01); *G06F 16/9024* (2019.01)

(58) Field of Classification Search
CPC .... G06F 12/1009; G06F 12/12; G06F 16/907; G06F 16/9024; G06F 9/45554
USPC .......................................................... 711/203
See application file for complete search history.

(56) References Cited

U.S. PATENT DOCUMENTS

| | | | | | |
|---|---|---|---|---|---|
| 5,784,697 | A | * | 7/1998 | Funk ..................... | G06F 9/5016 711/170 |
| 5,897,664 | A | * | 4/1999 | Nesheim ............. | G06F 12/0284 711/147 |
| 6,286,092 | B1 | * | 9/2001 | Frank ................... | G06F 12/1009 711/207 |
| 10,445,243 | B2 | * | 10/2019 | Duluk, Jr. ........... | G06F 11/0793 |
| 10,929,295 | B2 | * | 2/2021 | Gandhi ............... | G06F 12/0853 |
| 2007/0016755 | A1 | * | 1/2007 | Pratt ................... | G06F 12/1036 711/207 |
| 2008/0040565 | A1 | * | 2/2008 | Rozas .................. | G06F 12/145 711/163 |
| 2009/0254724 | A1 | * | 10/2009 | Vertes ..................... | G06F 9/526 711/162 |
| 2010/0250869 | A1 | * | 9/2010 | Adams ................ | G06F 12/0891 711/154 |

(Continued)

*Primary Examiner* — Sheng Jen Tsai
(74) *Attorney, Agent, or Firm* — Dinsmore & Shohl LLP

(57) ABSTRACT

An example method of managing memory in a computer system implementing non-uniform memory access (NUMA) by a plurality of sockets each having a processor component and a memory component is described. The method includes replicating page tables for an application executing on a first socket of the plurality of sockets across each of the plurality of sockets; associating metadata for pages of the memory storing the replicated page tables in each of the plurality of sockets; and updating the replicated page tables using the metadata to locate the pages of the memory that store the replicated page tables.

20 Claims, 8 Drawing Sheets

(56) References Cited

U.S. PATENT DOCUMENTS

| | | | |
|---|---|---|---|
| 2010/0250895 A1* | 9/2010 | Adams | G06F 12/109 |
| | | | 711/207 |
| 2014/0089572 A1* | 3/2014 | Koka | G06F 12/1072 |
| | | | 711/105 |
| 2014/0372806 A1* | 12/2014 | Yabe | G06F 11/0712 |
| | | | 714/38.11 |
| 2017/0041393 A1* | 2/2017 | Mortazavi | G06F 3/061 |
| 2017/0344490 A1* | 11/2017 | Blagodurov | G06F 12/1081 |
| 2018/0032443 A1* | 2/2018 | Kaplan | G06F 12/1027 |
| 2018/0032447 A1* | 2/2018 | Kaplan | G06F 9/45558 |
| 2018/0232320 A1* | 8/2018 | Raval | G06F 12/1491 |
| 2018/0373561 A1* | 12/2018 | Nassi | G06F 9/5077 |
| 2019/0146803 A1* | 5/2019 | Reed | G06F 9/4856 |
| | | | 703/2 |
| 2019/0188148 A1* | 6/2019 | Dong | G06F 12/1009 |
| 2020/0233804 A1* | 7/2020 | Gandhi | G06F 12/0853 |

\* cited by examiner

TRANSPARENT SELF-REPLICATING PAGE TABLES IN COMPUTING SYSTEMS

CROSS-REFERENCE TO RELATED APPLICATIONS

This application claims priority to U.S. Provisional Patent Application Ser. No. 62/744,990, filed Oct. 12, 2018, which is incorporated herein by reference.

BACKGROUND

Computing is becoming more data centric, where low-latency access to a very large amount of data is critical. This trend is largely supported by increasing role of big-data applications in our day-to-day lives. In addition, virtual machines are playing a critical role in server consolidation, security and fault tolerance as substantial computing migrates to shared resources in cloud services. This trend is evident due to increasing support for public, enterprise and private cloud services by various companies. These trends put a lot of pressure on the virtual memory system—a layer of abstraction designed for applications to manage physical memory easily.

The virtual memory system translates virtual addresses issued by the application to physical addresses for accessing the stored data. Since the software stack accesses data using virtual addresses, fast address translation is a prerequisite for efficient data-centric computation and for providing the benefits of virtualization to a wide range of applications. But unfortunately, growth in physical memory sizes is exceeding the capabilities of the virtual memory abstraction—paging. Paging has been working well for decades in the old world of scarce physical memory, but falls far short in the new world of gigabyte-to-terabyte memory sizes.

SUMMARY

An example method of managing memory in a computer system implementing non-uniform memory access (NUMA) by a plurality of sockets each having a processor component and a memory component is described. The method includes replicating page tables for an application executing on a first socket of the plurality of sockets across each of the plurality of sockets; associating metadata for pages of the memory storing the replicated page tables in each of the plurality of sockets; and updating the replicated page tables using the metadata to locate the pages of the memory that store the replicated page tables.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
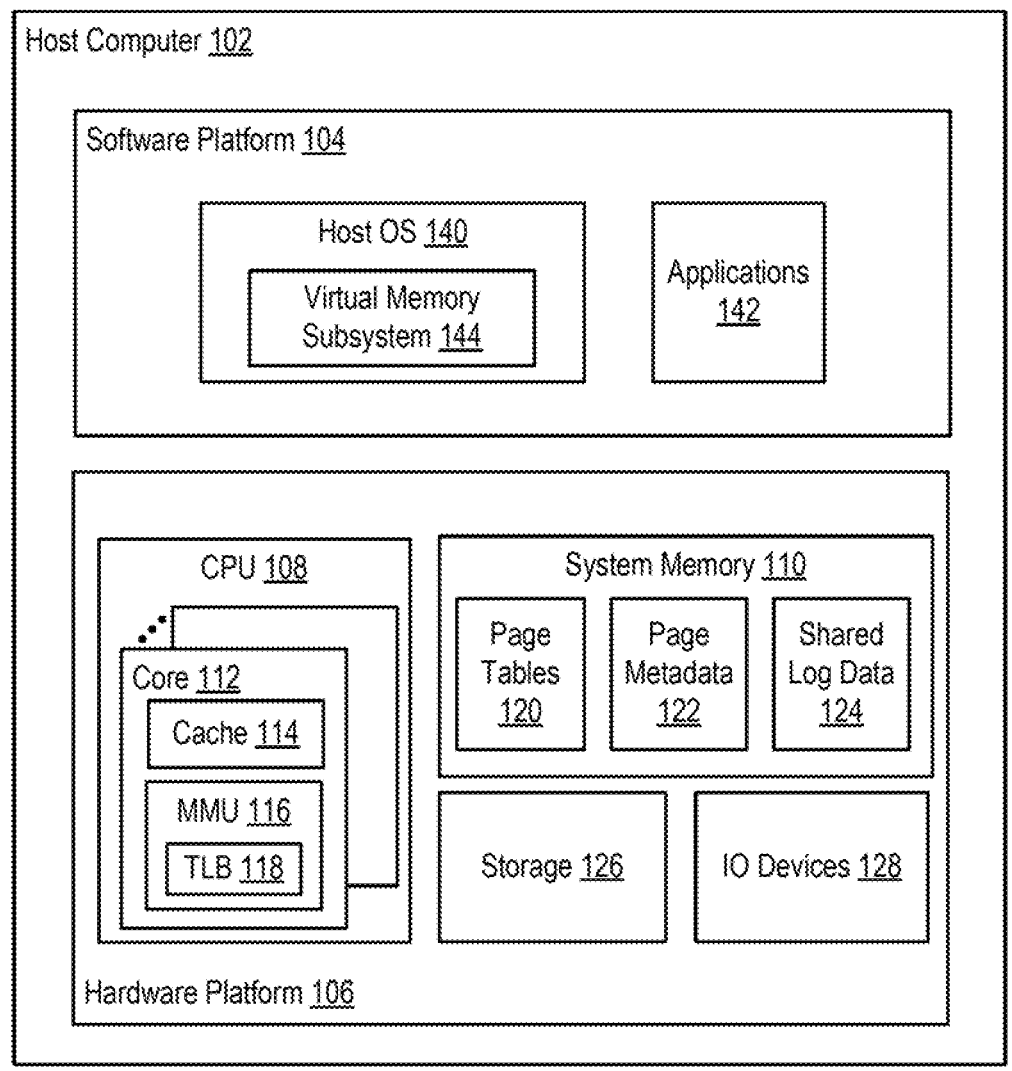
FIG. 1 is a block diagram depicting a computing system according to an embodiment.

FIG. 1 is a block diagram depicting a computing system 100 according to an embodiment. Computing system 100 includes a host computer 102 having a software platform 104 executing on a hardware platform 106. Hardware platform 106 may include conventional components of a computing device, such as a central processing unit (CPU) 108 and system memory 110, as well as a storage system (storage 126), input/output devices 128, and the like. CPU 108 is configured to execute instructions, for example, executable instructions that perform one or more operations described herein and may be stored in system memory 110 and the storage system. System memory 110 is a device allowing information, such as executable instructions, virtual disks, configurations, and other data, to be stored and retrieved. System memory 110 may include, for example, one or more random access memory (RAM) modules. Storage 126 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. IO devices 128 include various network interfaces and the like.

CPU 108 includes one or more cores 112. Each core 112 is a microprocessor or like type processor element. Each core 112 includes cache memory (cache 114) and a memory management unit (MMU) 116, as well as various other circuits that are omitted for clarity (e.g., an arithmetic logic unit (ALU), floating point unit (FPU), etc.). CPU 108 can include other circuitry shared by cores 112 (e.g., additional cache memory), which is omitted for clarity.

MMU 116 implements memory management in the form of paging of system memory 110. MMU 116 controls address translation and access permissions for memory accesses made by core 112. MMU 116 implements a plurality of address translation schemes based on privilege level (also referred to as "translation schemes"). Each translation scheme generally takes an input address (IA) and, if permitted based on the defined access permissions, returns an output address (OA). If an address translation cannot be performed (e.g., due to violation of the access permissions), MMU 116 generates an exception. MMU 116 is controlled by a plurality system registers in registers 114. MMU 116 can include a translation lookaside buffer (TLB) 118 that caches address translations.

One type of translation scheme includes a single stage of address translation that receives a virtual address (VA) in a virtual address space and outputs a physical address (PA) in a physical address space. The virtual address space is a flat logical address space managed by software. The physical address space includes the physical memory map that includes system memory 110. Another type of translation scheme includes two stages of address translation. The first stage of address translation receives a VA and outputs an intermediate physical address (IPA) in an intermediate physical address space. The second stage of address translation receives an IPA and outputs a PA. The IPA address space is a flat logical address space managed by software. Two-stage address translation is discussed further below with respect to a virtualized computing system.

Software platform 104 includes a host operating system (OS) 140 and applications 142. Host OS 140 executes directly on hardware platform 102. Host OS 140 can be any commodity operating system known in the art, such as such as Linux®, Microsoft Windows®, Mac OS®, or the like. Host OS 140 includes a virtual memory subsystem 144. Virtual memory subsystem 144 comprises program code executable by CPU 108 to managing paging and access to system memory 110 (e.g., on behalf of applications 142).

Virtual memory subsystem 144 divides system memory 110 into pages. A "page" is the smallest unit of memory for which an IA-to-OA mapping can be specified. Each page (also referred to herein as a "memory page") includes a plurality of separately addressable data words, each of which in turn includes one or more bytes. Each address includes an upper portion that specifies a page and a lower portion that specifies an offset into the page. Each address translation involves translating the upper portion of the IA into an OA. CPU 108 can support one or more page sizes. For example, some processors support 4 kilobyte (KB), 2 megabyte (MB), and 1 gigabyte (GB) page sizes. Other processors may support other page sizes. In addition, the width of the IA can be configurable for each address translation scheme.

Each enabled stage of address translation in a translation scheme uses memory mapped tables referred to as page tables 120. If not cached in TLB 118, a given address translation requires one or more lookups of page tables 120 (referred to as one or more levels of lookup). A page table walk, which can be implemented by the hardware of MMU 116, is the set of lookups required to translate a VA to a PA. Page tables 120 are organized into hierarchies, where each page table hierarchy includes a base table and a plurality of additional tables corresponding to one or more additional levels. For example, some processors specify up to four levels of page tables referred to as level 1 through level 4 tables. The number of levels in a page table hierarchy depends on the page size. Virtual memory subsystem 144 can also maintain page metadata 122 for each page defined by the system. In some embodiments, virtual memory subsystem 144 also maintains shared log data 124, as discussed further below.

Figure 2:
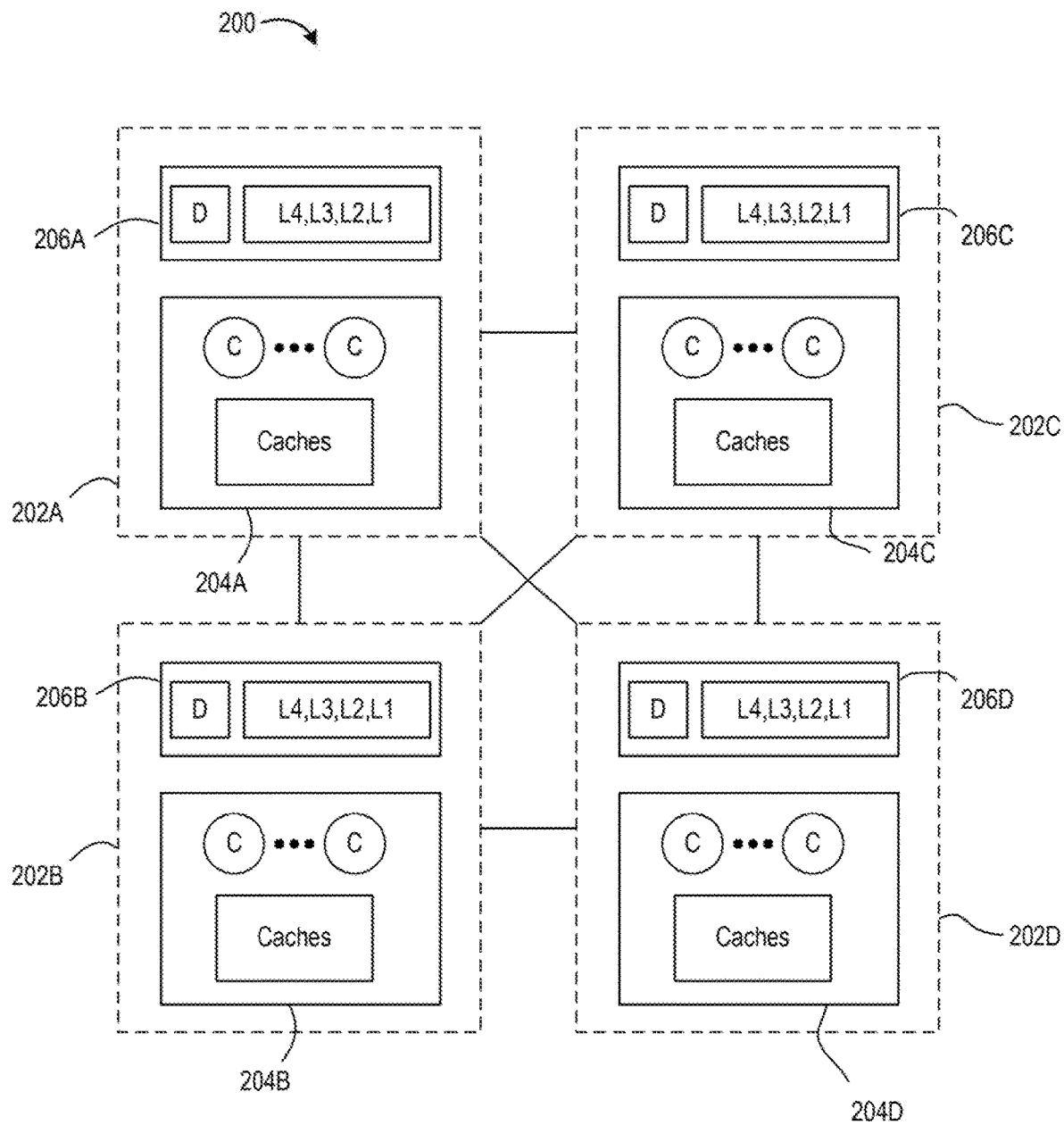
FIG. 2 is a block diagram depicting a non-uniform memory access (NUMA) system according to an embodiment.

FIG. 2 is a block diagram depicting a non-uniform memory access (NUMA) system 200 according to an embodiment. The NUMA system 200 includes a plurality of sockets, e.g., sockets 202A, 202B, 202C, and 202D (generally sockets 202). Each socket 202 includes a processor component 204 and a memory component 206 (processor components 204A-D and memory components 206A-D). Processor component 204 includes one or more of cores 112 and cache 114. Memory component 206 includes a portion of system memory 110. Processor component 204 can access memory component 206 within the same socket 202 (e.g., memory in the same socket is local to the processing component). Sockets 202 are also interconnected with each other. A processor component 204 in one socket can access a memory component 206 in another socket through an interconnection between sockets 202.

When applications have very large working sets, TLBs can cause performance degradation on native machines. Such workloads running in a virtualized system exacerbate this problem. In big memory machines, when big-memory applications execute, the TLB misses causes many RAM accesses (not just data cache accesses) specifically for lower levels of page tables. This causes the TLB misses to be costly for application performance. This also translates to much worse performance for big-memory virtual machines. Big memory machines typically have a multi-socket NUMA architecture. Many of these machines can have really different memory access latencies depending on which RAM a particular core is accessing. The ratio of latencies has been shown to vary from 2× to sometimes over 10× depending on the NUMA architecture designed. The main issues is that if the page tables are allocated in different sockets, the TLB miss may have to traverse multiple sockets to resolve the miss and introduce a TLB entry. If all the page table entries were in local memory (RAM or caches on the same socket as the core), then the TLB miss may have resolved a lot faster, since it would not be affected by NUMA latency effects. As TLB misses becomes a lot more frequent for big-memory applications, this will be an impediment to attaining their performance potential.

In an embodiment, virtual memory subsystem 144 replicates page tables for each multi-threaded process on all sockets transparently. Thus, each memory component 206 stores data "D" and replicated page tables (e.g., L1-L4). The technique supports huge pages in the replicated page tables. The replication can be enabled and controlled by a user library, such as numctl, that controls which sockets the application can run on and where its data can be allocated. The technique creates a complete replica of the page table on each of the socket, but points to the same data page on the leaf levels. Typically, if a core in socket 0 has a TLB miss for data "D" which is local to the socket, it may perform up to four remote accesses to resolve the TLB miss to only find out that the data was local to its socket and then access the local data. Whereas with the page table replication described herein, socket 0 on a TLB miss for data "D" which is local to the socket performs up to four local accesses to resolve the TLB miss and access the local data D. The local accesses for all TLB misses makes the applications run faster. This is shown in FIG. 2, where the page table hierarchy is replicated across each of sockets 202.

A page table is mostly managed by software (OS 140) most of the time and read by the hardware (on a TLB miss). Accessed and dirty bits are usually set atomically by hardware on the first access to the page and first write to the page respectively. These two bit of metadata are only set by the hardware and reset by the OS. When replicated, this metadata needs to be kept coherent (instantly or at least lazily) for correctness. Accessed and dirty bits are used by the OS for system-level operations like swapping. In an embodiment, virtual memory subsystem 144 logically ORs accessed and dirty bits between all the page table replicas when read by the OS. Virtual memory subsystem 144 also sets this metadata in the other replicas if one of replicas has it set.

Usual updates to page tables provide a virtual address and the update required to it. For example, a new physical page is allocated for a virtual address on page fault or change access permission on a page through mprotect syscall. The main bottleneck in updating all replicas is to walk all the N page table replicas in an N-socket system. This would require a lot more memory references since walking each replica would take up to four memory references on a page fault path or syscall path.

Virtual memory subsystem 144 optimizes the update path by creating a circular linked list of all replicas using page metadata 122. Each of the replica page points to the next replica page. For example, virtual memory subsystem 144 can use struct page in LINUX, which is allocated for each physical page to store the pointer to the next replica. Similarly, virtual memory subsystem 144 can use other per page data structure in other OSes and hypervisors to create such a circular linked list of replicas. With this optimization, the update of all N replicas takes 2N memory references; N for updating the N replicas itself and N for reading the pointers to the next replica.

Figure 3:
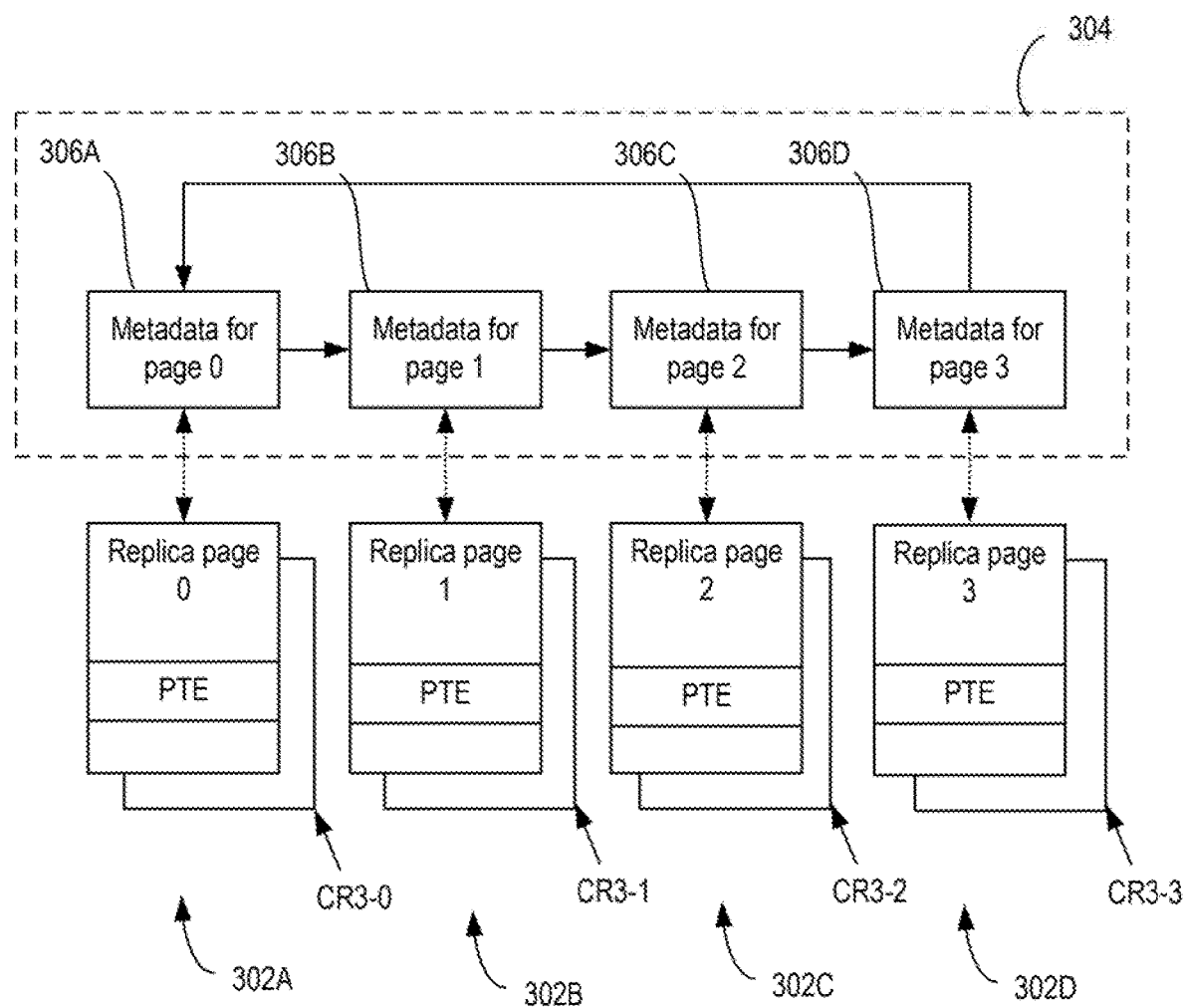
FIG. 3 is a block diagram depicting the metadata associated with replicated page tables according to an embodiment.

FIG. 3 is a block diagram depicting the metadata associated with replicated page tables according to an embodiment. In the embodiment, virtual memory subsystem 144 replicates page tables 302A . . . 302D across four sockets, and each page table hierarchy includes four levels of page tables. A given page table entry (PTE) is stored in each of replica pages 0 through 3 across page tables 302A . . . 302D. Virtual memory subsystem 144 maintains metadata for each page, including metadata 306A . . . 306D for the replica pages 0 through 3. Virtual memory subsystem 144 adds a pointer to each metadata 306 to create a circular lined list 304. In this manner, virtual memory subsystem 144 can locate and update each replicated PTE by traversing the circular linked list.

Virtual memory subsystem 144 updates the page tables and all its replicas at the same time to not cause any incoherence in the replicated page tables. This is easily controlled since OS updates the page tables and it has the knowledge of each replica and where each replica is. But on each update, virtual memory subsystem 144 does need to go through the circular linked list and apply each update to other replicas. Even though the updates are optimized with circular buffers, they can still have higher overheads if they happen frequent enough. In an embodiment, virtual memory subsystem 144 reduces the overheads by staging the updates: first quickly write the update to a shared log (virtual address and update to the page table) and then apply the updates to all the replicas asynchronously at a later time. This provides a quick way to improve the critical update path by not updating any of the replicas.

Figure 4:
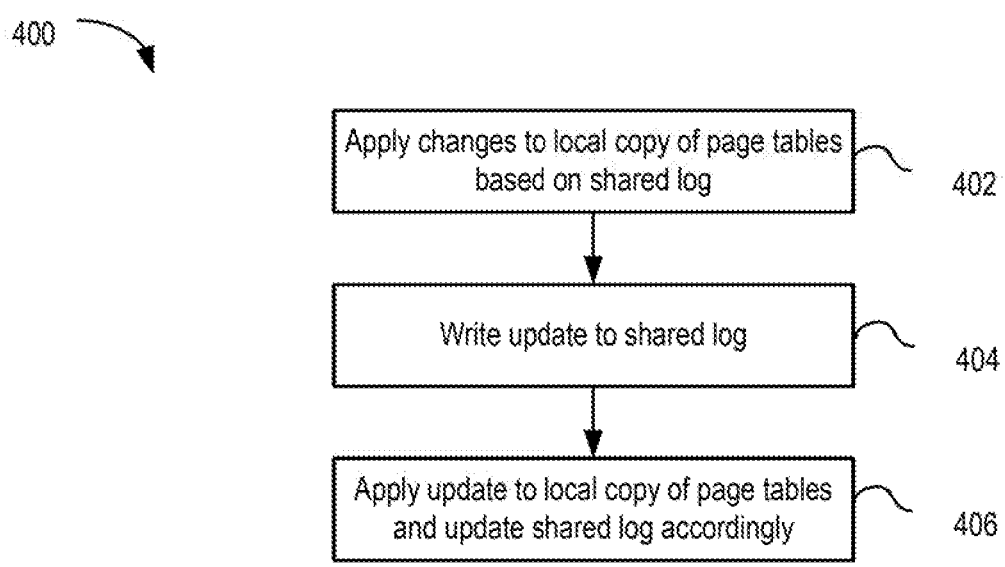
FIG. 4 is a flow diagram depicting a method of updating replicated page tables according to an embodiment.

FIG. 4 is a flow diagram depicting a method 400 of updating replicated page tables according to an embodiment. Method 400 begins at step 402, where virtual memory subsystem 144 applies all changes to the local copy of the page tables by going over all the log entries between the local tail of the shared log to the global tail. At step 404, virtual memory subsystem 144 writes the update to the shared log at the global tail. The update includes the virtual address, the change to the PTE, and pointer to page metadata structure for the local page (to locate the other replicas faster, but optional). At step 406, the virtual memory subsystem 144 applies the update locally as well and updates the local tail to show that the new shared log entry is applied locally.

In an embodiment, virtual memory subsystem 144 implements two exceptions for the update process shown in FIG. 4. First, on a global TLB flush, every core receives an IPI (inter process interrupt) to issue a self TLB flush. At this point, all the changes are to be applied to every local replica, so all the replicas are updated, and then issue the self TLB flush to finish the IPI. In an embodiment, the IPI function of host OS 140 is augmented to support this change. Second, on a page fault (on a page missing or protection missing), virtual memory subsystem 144 performs step 402. But, if the page fault is resolved by applying all the changes to the local replica, virtual memory subsystem 144 returns from the page fault without making any changes to the shared log. This can happen if some other tread on another socket has already made changes to the page table state, but the local replica has not caught up to the changes performed by other sockets.

With a single page table mapping one virtual address to one physical address, it is not possible to replicate read-only data easily without changes to the page tables. But since there are replicated page tables, one virtual address mapped to different physical addresses can be created based on which replica page table being used. In this case, the replica page tables will not be mapping the same data pages any more. They will deviate for the read-only pages that are replicated themselves. In an embodiment, virtual memory subsystem 144 performs the replication of data pages only for read-only pages since there are no updates to those data pages.

Figure 5:
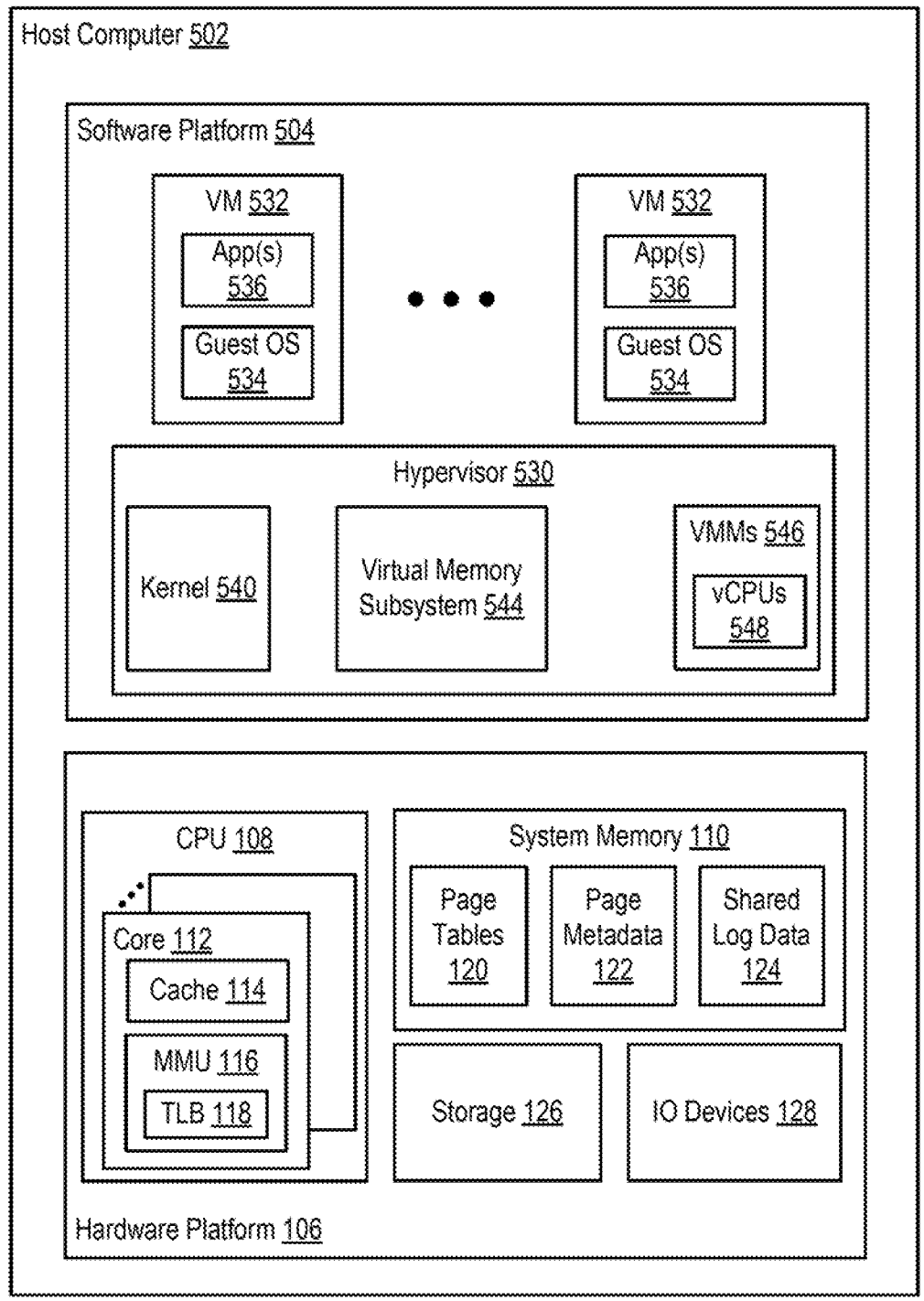
FIG. 5 is a block diagram depicting a virtualized computing system according to an example.

FIG. 5 is a block diagram depicting a virtualized computing system 500 according to an example. Virtualized computing system 500 includes a host computer 502 having the hardware platform 106 and a software platform 504. Hardware platform 106 is the same or similar to that described above in FIG. 1. Software platform 504 includes a virtualization layer that abstracts processor, memory, storage, and networking resources of hardware platform 106 into one or more virtual machines ("VMs") 532 that run concurrently on host computer 502. VMs 532 run on top of the virtualization layer, referred to herein as a hypervisor 530, which enables sharing of the hardware resources by VMs 532. One example of hypervisor 530 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein).

Each VM 532 supported by hypervisor 530 includes guest software (also referred to as guest code) that runs on the virtualized resources supported by hardware platform 106. In the example shown, the guest software of each VM 532 includes a guest OS 534 and one or more applications (apps) 536. Guest OS 534 can be any commodity operating system known in the art, such as such as Linux®, Microsoft Windows®, Mac OS®, or the like.

Hypervisor 530 includes, among other components, a kernel 540, a virtual memory subsystem 544, and virtual machine monitors (VMMs) 546. Kernel 540 provides operating system functionality (e.g., process creation and control, file system, process threads, etc.), as well as CPU scheduling and memory scheduling. VMMs 546 implement the virtual system support needed to coordinate operations between hypervisor 530 and VMs 532. Each VMM 546 manages a corresponding virtual hardware platform that includes emulated hardware, such as virtual CPUs (vCPUs 548) and guest physical memory. vCPUs 548 are backed by cores 112. Guest physical memory is backed by system memory 110. Each virtual hardware platform supports the installation of guest software in a corresponding VM 532.

In virtualized computing system 500, guest software in a VM 532 can access memory using the two-stage address translation scheme. In this context, a virtual address is referred to as a "guest virtual address" or GVA. An intermediate physical address is referred to as a "guest physical address" or GPA. A physical address is referred to as a "host physical address" or HPA.

Virtualization brings two layers of page tables to translate addresses. In embodiments, there are two ways of handling the two levels of address translation: 1. replicate on different sockets both levels of page tables while keeping the same exact mappings at both levels of page tables. This option requires guest OS to know the NUMA architecture; 2. intelligently mapping the guest page tables differently on different sockets. This option is designed to be transparent to the guest OS. There are two ways achieving this intelligent mapping: (a) The host page table maps the pages of guest page table pages to different host physical pages by using the replicated nested page tables. In general, we can create multiple gPA->hPA mappings for just the guest page table pages and replicate them on all sockets. For this option, the hypervisor needs to track the updates to the guest page tables, so that it is correctly updated in all replica. We would leverage marking the guest page tables as read-only to so that hypervisor is interrupted on updates to the guest page table (a concept out of shadow paging). (b) Two-level page tables has longer TLB misses, we can reduce the length of TLB misses by using shadow paging. We can replicate the shadow page table on multiple sockets instead of replicating any parts of two-level page tables. Note that all the optimizations discussed above for computing system 100 can be applied to replication of two-level page tables to improve performance.

Full Replication of Both Page Table Levels

Full replication of both page tables is enabled by modification to guest OS 534 and hypervisor 530. This option works with full virtualization. Paravirtualization can help improve performance further. In addition, the NUMA architecture has to be exposed to guest OS 534, so the guest OS 534 can perform replication of guest page tables independent of the nested page tables. With this option, note that replication is independent in guest OS 534 and hypervisor 530: either can decide not to replicate at the cost of performance. For example, guest OS 534 may decide not to replicate the guest page tables, but hypervisor 530 can decide to replicate the page tables. This example shows an option that will lead to higher performance than no replication at all, but lower performance than both levels replicated. Keeping these options in mind, replication of both levels is discussed below.

Figure 6:
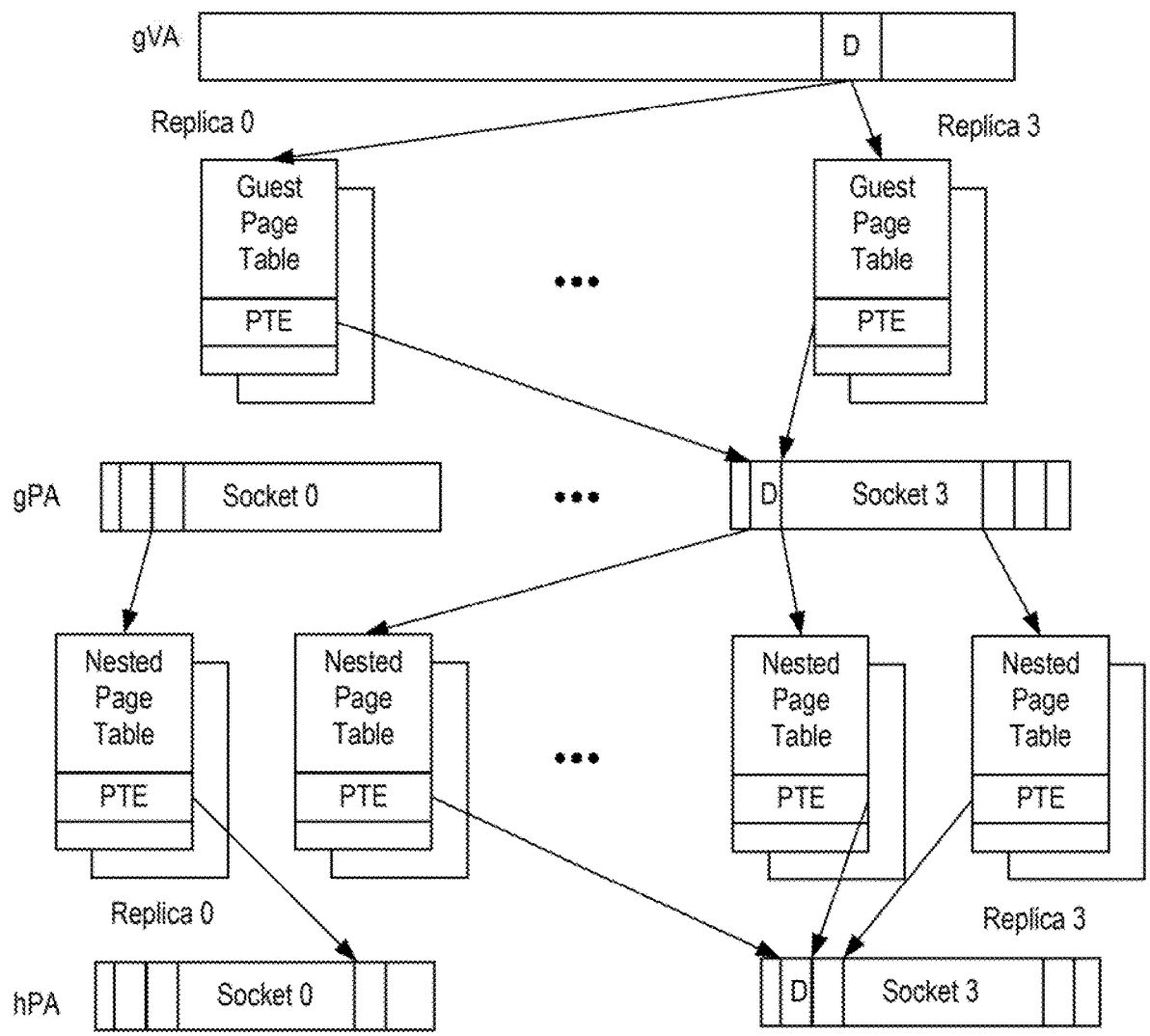
FIG. 6 is a block diagram showing the replication scheme for fully replicated page tables at both levels according to an embodiment.

FIG. 6 is a block diagram showing the replication scheme for fully replicated page tables at both levels according to an embodiment. Guest OS 534 replicates the guest page table on each socket exposed to it, shown by replicated pages in guest physical address space. Each guest page table replica would translate a gVA to the same gPA shown by the data (D) page in gVA being translated to the same gPA (data pages are not replicated). Hypervisor 530 replicates the nested page table on each socket on the hardware (assuming the VM is using all sockets). If the VM runs on lesser sockets, hypervisor 530 will replicate nested page tables only on the sockets where the VM is running. In addition, the VM would be exposed lesser sockets, so it does not replicate guest page tables more than required. Each replica of nested page table would translate a gPA to the same hPA as shown by data (D) page in gPA being translated to the same hPA. Each guest page table page (even replica pages) is also mapped from gPA to the same hPA by each replica of the nested page table. Note that there is no distinction between guest page table pages or data pages for hypervisor 530. This allows hypervisor 530 and guest OS 534 to operate independently. The only information that hypervisor 530 gets is to follow the allocation performed by guest OS 534 on different sockets is to the ensured on its physical page allocation too.

Transparent Guest Invisible Replication

To intelligently replicate guest page tables by using nested page tables without the guest OS 534 having any knowledge requires hypervisor 530 to distinguish between guest page tables pages and data pages in gPA. Due to this constraint, there are a few options in design that has different tradeoffs.

(a) Full Virtualization—Nested Paging

To distinguish between guest page table pages and data pages in gPA, the well trusted solution is marking guest page tables as read-only. This technique can be leveraged to replicate the guest page table pages on multiple sockets. The techniques can map gPA of a guest page table page to different hPAs in the nested page tables, thus having the effect of replicated guest page tables.

Figure 7:
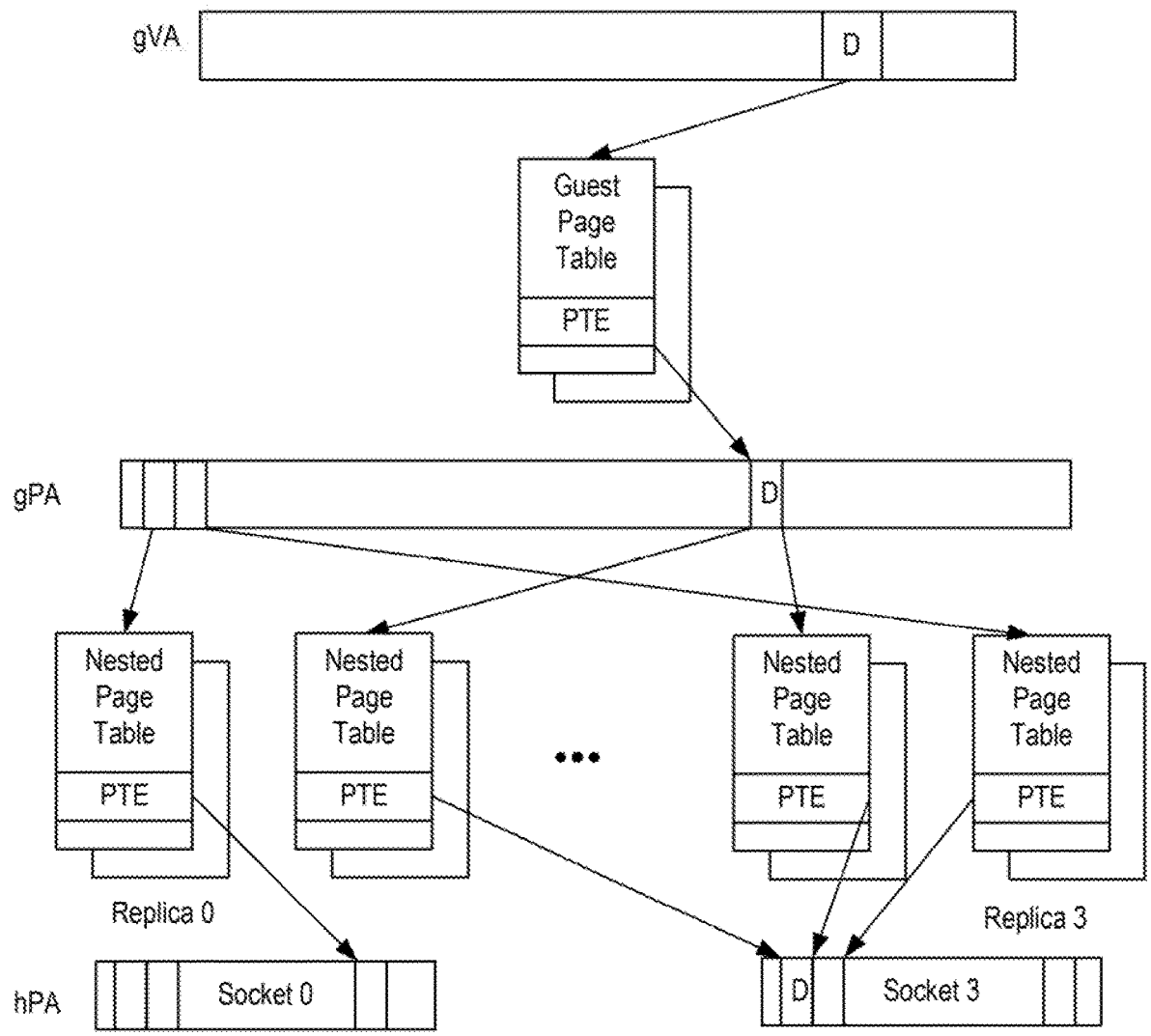
FIG. 7 is a block diagram showing the replication scheme for transparent guest invisible replication with hardware nested paging according to an embodiment.

FIG. 7 is a block diagram showing the replication scheme for transparent guest invisible replication with hardware nested paging according to an embodiment. Guest OS 534 as seen from FIG. 7 does not have any knowledge about NUMA architecture of the physical machine. Thus, guest OS 534 has a single copy of the guest page table that maps from gVA to gPA for the data page D as shown in the figure. The guest page table pages itself is allocated by the guest OS 534 in guest physical address space (as shown in figure by pages). The hypervisor 530 needs information about where the guest page table pages are allocated in gPA to make them transparently replicated. The nested page tables are replicated, so for each guest page table page a different gPA->hPA can be created for each nested page table, thus replicating guest page tables too. Once guest page table is replicated by the hypervisor 530, these replicas need to be kept coherent as well. So, on each update to the guest page table, hypervisor 530 is interrupted, so hypervisor can update other replicas as well.

Thus, the hypervisor 530 write-protects the guest page tables pages as done in shadow paging and guest OS 534 interrupts the hypervisor 530 on a update to the guest page table. Note that the hypervisor 530 differentiates between guest page table pages and data pages in guest physical address space. The gPA->hPA for each replica in nested page table for guest page table pages maps to the different host physical page whereas the data page in each replica of nested page table maps to the same physical page. This is depicted in FIG. 7 as well by showing how the page table pages are mapped as opposed to how data pages are mapped.

(b) Full Virtualization—Shadow Paging

In the previous section, hypervisor intervention was implemented by marking guest page tables as read-only (write protected) to replicate guest page tables transparently. The same mechanism is used by shadow paging. In some embodiments, software shadow paging is performed instead of hardware nested paging. Since the cost of hypervisor intervention is present, then use the replicated shadow paging to reduce the TLB miss overheads as well.

Figure 8:
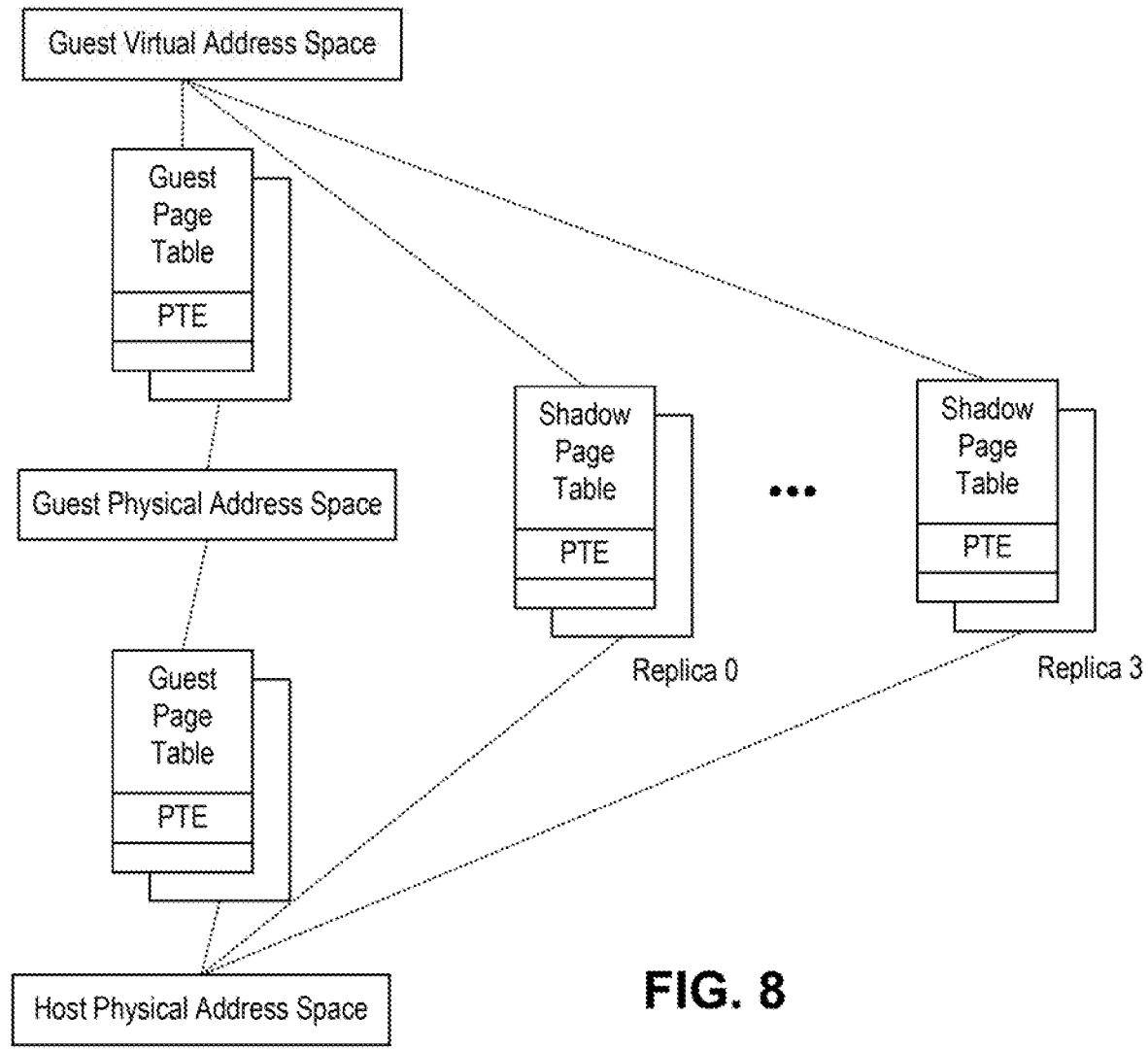
FIG. 8 is a block diagram showing the replication scheme of transparent guest invisible replication with software shadow paging according to an embodiment.

FIG. 8 is a block diagram showing the replication scheme of transparent guest invisible replication with software shadow paging according to an embodiment. In shadow paging, a shadow page table is maintained by VMM that maps directly from gVA->hPA. The VMM now can replicate the shadow page table on each socket without the guest OS knowing about it. On a TLB miss, the hardware page table walker walks the socket local shadow page table. On a page table update, the VMM updates all the replicas of the shadow page table since VMM is involved in any page table updates.

(c) Paravirtualization—Performance Optimization

Updates to guest page table by marking them read-only (write protected) is a costly operating since each VMM intervention on page table update costs 1000s of cycles. Some of these overheads can be reduced by using binary translation or paravirtualization. If the guest OS specifies which pages are guest page table pages and sends updates on guest page table to VMM with a hypercall, the overheads can be reduced. If VMM is provided the information that it needs by the guest OS, instead of it creating mechanisms to create the information itself, it can be more efficient.

Nested Virtualization and IO Page Tables

Recently, there has been an increasing interest in supporting nested virtualization—a VMM can run various VMMs, which can run their own VMs. This approach comes with its own set of benefits: (i) public cloud providers can give consumers full control of their VMs by making them run on their own favorite VMM, (ii) increase security and integrity of VMs on public clouds even when the VMM provided by service provider is compromised, (iii) enable new features used by VMMs which the service providers are slow to adopt (like VM migration), and (iv) help debug, build and benchmark new VMMs. Vendors like VMware have been supporting nested virtualization by using software techniques.

Hardware advancement such as VMCS shadowing are being included in recent processors (e.g., Intel Haswell) to perform efficient nested virtualization. Unfortunately, these benefits of nested virtualization come at the cost of increasing the memory virtualization overheads because of the additional levels of abstraction. This new interest in nested virtualization motivates us to think about providing a scalable solution for memory virtualization in presence of more levels of virtualization. The same techniques described above can be used to improve performance of nested virtualized systems running on NUMA machines.

I/O page tables are used by devices and accelerators to access system physical memory. In presence of multiple sockets, devices are connected directly to one socket or are shared between multiple sockets. In case the device is shared between multiple sockets, it makes sense to replicate the I/O page tables on sockets which shares the devices. This way the device can access the local physical memory by using the closest page table. In addition, the data can be prefetched based on the local pointed by I/O page table entry.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of managing memory in a computer system implementing non-uniform memory access (NUMA) by a plurality of sockets each having a processor component and a memory component, the method, comprising:
   replicating page tables for an application executing on a first socket of the plurality of sockets across each of the plurality of sockets such that the memory component of each of the plurality of sockets stores a replica of the page tables;
   maintaining metadata for pages of the memory storing the replicated page tables in each of the plurality of sockets; and
   updating the replicated page tables using the metadata to locate the pages of the memory that store the replicated page tables.

2. The method of claim 1, wherein the step of maintaining comprises:
   forming a circular linked list of metadata structures, each metadata structure associated with a page of the memory storing data of a respective replicated page table and including a pointer to a next metadata structure.

3. The method of claim 2, wherein the step of updating comprises:
   storing updates to the replicated page tables in a shared log; and
   applying the updates to the replicated page tables from the shared log.

4. The method of claim 2, wherein the step of updating comprises:
   applying changes to a first set of replicated page tables based on a shared log;
   writing an update for the replicated page tables to the shared log; and
   applying the update to the first set of replicated page tables.

5. The method of claim 1, wherein the computer system is a virtualized computer system comprising a hypervisor, and wherein the replicated page tables comprises first replicated page tables of a guest operating system executing in a virtual machine managed by the hypervisor, and second replicated page tables of the hypervisor.

6. The method of claim 1, wherein the computer system is a virtualized computer system comprising a hypervisor, wherein a guest operating system executing in a virtual machine managed by the hypervisor includes a guest page table, and wherein the replicated page tables include nested page tables managed by the hypervisor.

7. The method of claim 1, wherein the computer system is a virtualized computer system comprising a hypervisor, wherein a guest operating system executing in a virtual machine managed by the hypervisor includes a guest page table, and wherein the replicated page tables include shadow page tables managed by the hypervisor.

8. A non-transitory computer readable medium comprising instructions, which when executed in a computer system, causes the computer system to carry out a method of managing memory in a computer system implementing non-uniform memory access (NUMA) by a plurality of sockets each having a processor component and a memory component, the method, comprising:
   replicating page tables for an application executing on a first socket of the plurality of sockets across each of the plurality of sockets such that the memory component of each of the plurality of sockets stores a replica of the page tables;
   maintaining metadata for pages of the memory storing the replicated page tables in each of the plurality of sockets; and
   updating the replicated page tables using the metadata to locate the pages of the memory that store the replicated page tables.

9. The non-transitory computer readable medium of claim 8, wherein the step of maintaining comprises:
   forming a circular linked list of metadata structures, each metadata structure associated with a page of the memory storing data of a respective replicated page table and including a pointer to a next metadata structure.

10. The non-transitory computer readable medium of claim 9, wherein the step of updating comprises:
    storing updates to the replicated page tables in a shared log; and
    applying the updates to the replicated page tables from the shared log.

11. The non-transitory computer readable medium of claim 9, wherein the step of updating comprises:
    applying changes to a first set of replicated page tables based on a shared log;
    writing an update for the replicated page tables to the shared log; and
    applying the update to the first set of replicated page tables.

12. The non-transitory computer readable medium of claim 8, wherein the computer system is a virtualized computer system comprising a hypervisor, and wherein the replicated page tables comprises first replicated page tables of a guest operating system executing in a virtual machine managed by the hypervisor, and second replicated page tables of the hypervisor.

13. The non-transitory computer readable medium of claim 8, wherein the computer system is a virtualized computer system comprising a hypervisor, wherein a guest operating system executing in a virtual machine managed by the hypervisor includes a guest page table, and wherein the replicated page tables include nested page tables managed by the hypervisor.

14. The non-transitory computer readable medium of claim 8, wherein the computer system is a virtualized computer system comprising a hypervisor, wherein a guest operating system executing in a virtual machine managed by the hypervisor includes a guest page table, and wherein the replicated page tables include shadow page tables managed by the hypervisor.

15. A computer system, comprising:
    a plurality of sockets implementing non-uniform memory access (NUMA) each having a processor component and a memory component;
    software, executing on the plurality of sockets, configured to:
        replicate page tables for an application executing on a first socket of the plurality of sockets across each of the plurality of sockets such that the memory component of each of the plurality of sockets stores a replica of the page tables;
        maintain metadata for pages of the memory storing the replicated page tables in each of the plurality of sockets; and
        update the replicated page tables using the metadata to locate the pages of the memory that store the replicated page tables.

16. The computer system of claim 15, wherein the maintaining comprises:
    forming a circular linked list of metadata structures, each metadata structure associated with a page of the memory storing data of a respective replicated page table and including a pointer to a next metadata structure.

17. The computer system of claim 16, wherein the updating comprises:
    storing updates to the replicated page tables in a shared log; and
    applying the updates to the replicated page tables from the shared log.

18. The computer system of claim 16, wherein the updating comprises:
    applying changes to a first set of replicated page tables based on a shared log;
    writing an update for the replicated page tables to the shared log; and
    applying the update to the first set of replicated page tables.

19. The computer system of claim 15, further comprising a hypervisor, wherein the replicated page tables comprises first replicated page tables of a guest operating system executing in a virtual machine managed by the hypervisor, and second replicated page tables of the hypervisor.

20. The computer system of claim 15, further comprising a hypervisor, wherein a guest operating system executing in a virtual machine managed by the hypervisor includes a guest page table, and wherein the replicated page tables include nested page tables managed by the hypervisor.

* * * * *